United States Patent [19]

Lawless

[11] Patent Number: 5,205,990
[45] Date of Patent: Apr. 27, 1993

[54] OXYGEN GENERATOR HAVING HONEYCOMB STRUCTURE

[76] Inventor: William N. Lawless, c/o CeramPhysics, Inc., 921 Eastwind Dr., Ste. 110, Westerville, Ohio 43081

[21] Appl. No.: 562,901

[22] Filed: Aug. 2, 1990

[51] Int. Cl.⁵ .................. C25B 9/00; H01M 14/00
[52] U.S. Cl. .................... 422/121; 422/122; 429/30; 429/34; 429/104; 429/140; 204/242
[58] Field of Search ................ 422/120–125; 204/409–411, 242, 267, 270, 277, 278, 275; 429/30, 32, 31, 34–39, 104, 140, 149, 191, 193, 247; 55/311, 16, 158, 523, 529; 428/116–118

[56] References Cited

U.S. PATENT DOCUMENTS

| 3,400,054 | 9/1968 | Ruka et al. | 204/153.18 |
|---|---|---|---|
| 4,195,119 | 3/1980 | Kummer | 429/38 |
| 4,279,974 | 7/1981 | Nishio | 429/104 |
| 4,296,608 | 10/1981 | Lawless | 423/593 |
| 4,462,891 | 7/1984 | Lawless | 204/427 |
| 4,533,584 | 8/1985 | Takenchi et al. | 428/116 |
| 4,547,277 | 10/1985 | Lawless | 204/252 |
| 4,666,798 | 5/1987 | Herceg | 429/30 |
| 4,857,089 | 8/1989 | Kitagawa et al. | 55/523 |
| 4,874,678 | 10/1989 | Reichner | 429/30 |
| 4,877,506 | 10/1989 | Fee et al. | 204/410 |
| 4,883,497 | 11/1989 | Claar et al. | 429/33 |
| 4,937,152 | 6/1990 | Sato et al. | 429/30 |
| 4,943,494 | 7/1990 | Riley | 429/30 |
| 5,009,763 | 4/1991 | Hise | 429/30 |
| 5,034,023 | 7/1991 | Thompson | 429/30 |

Primary Examiner—Michael G. Wityshyn
Assistant Examiner—William H. Beisner
Attorney, Agent, or Firm—Killworth, Gottman, Hagan & Schaeff

[57] ABSTRACT

An oxygen generator having a honeycomb body made of oxygen ion conducting material separates oxygen from a first gas, such as air. The honeycomb body has a plurality of generally parallel first and second channels coated with a layer of porous metal conductor which serve as electrodes. The first and second channels are arranged in alternating rows across the face of the honeycomb and the respective electrodes therein are oppositely charged by connection to a voltage source. Oxygen ions from a first gas in the first channels are caused to tranit across the channel walls to the second channels under an applied voltage. Oxygen generated in the second channels may be collected in a manifold through a set of third channels which intersect the sealed second channels, and used in applications such as home breathing apparatus'. Additional features are included in the honeycomb body and in the design of manifolds to facilitate the supply of a first gas and collection of oxygen. Preferably operating at elevated temperatures, the oxygen generator may also incorporate a heater and valve for start up and a heat exchanger for thermally efficient steady state operation.

40 Claims, 9 Drawing Sheets

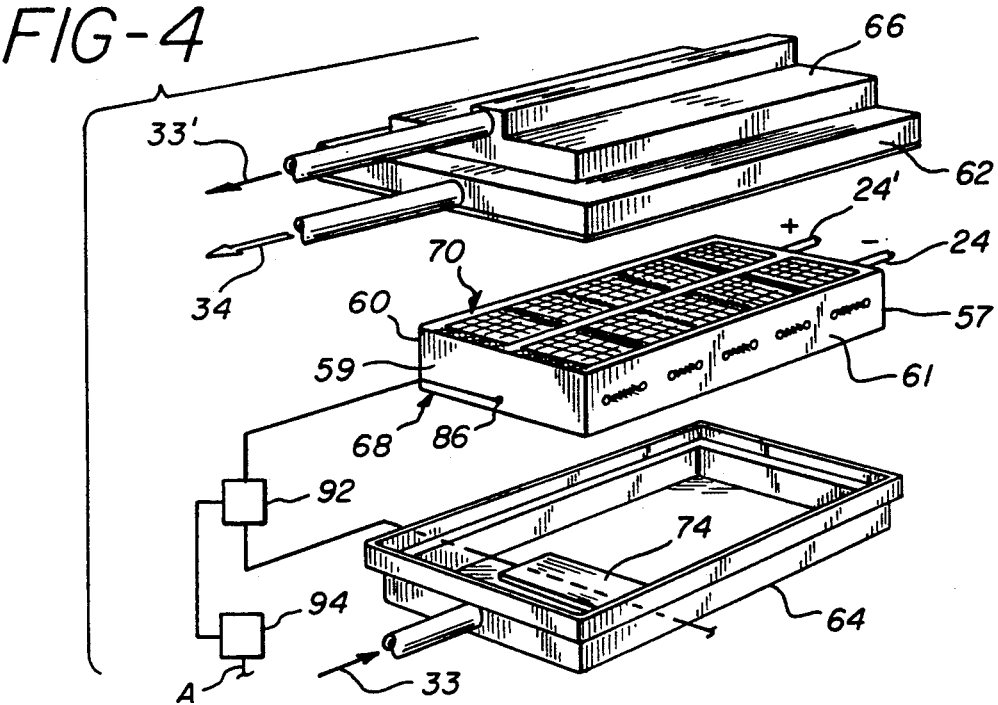
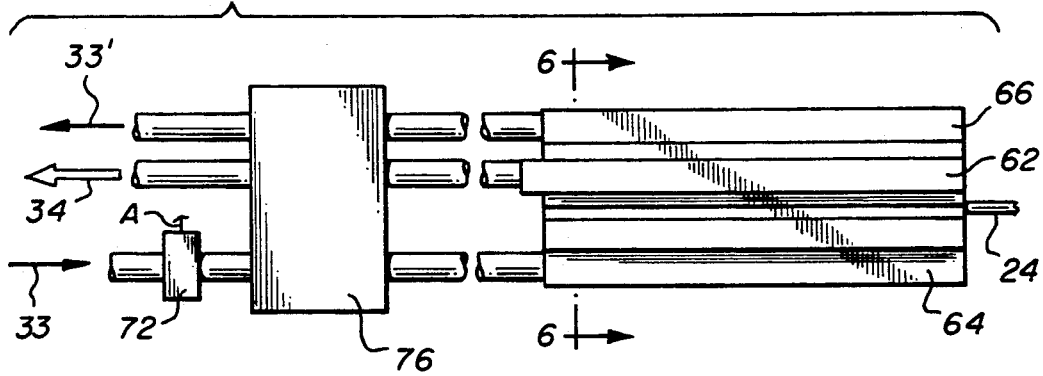
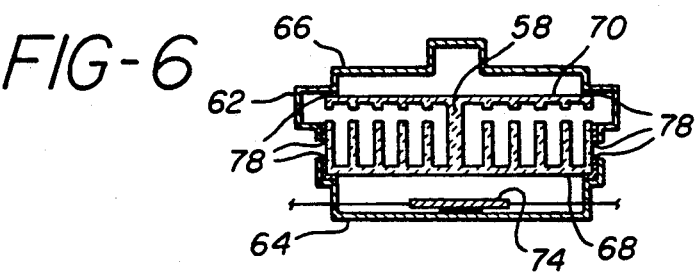

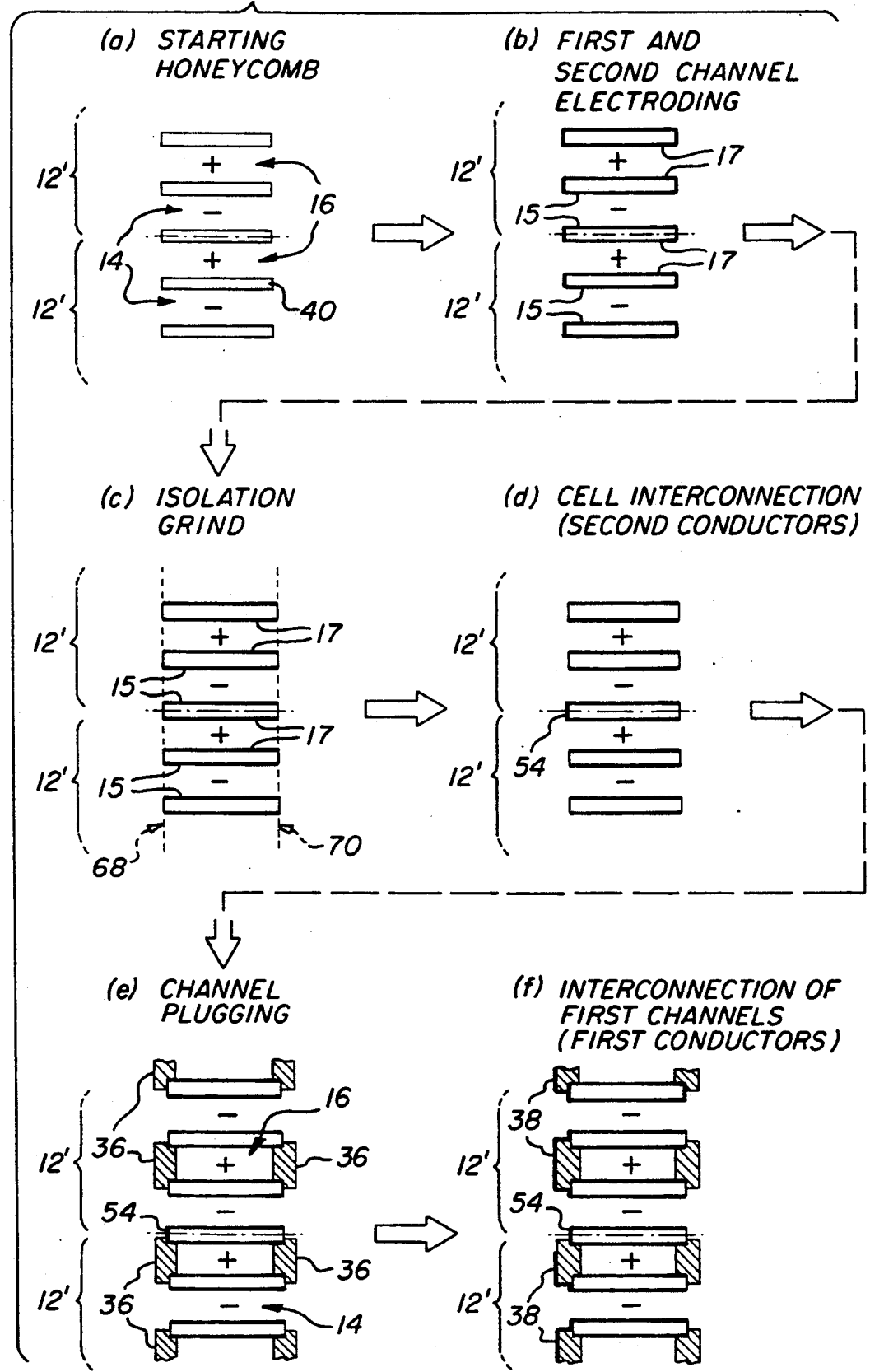

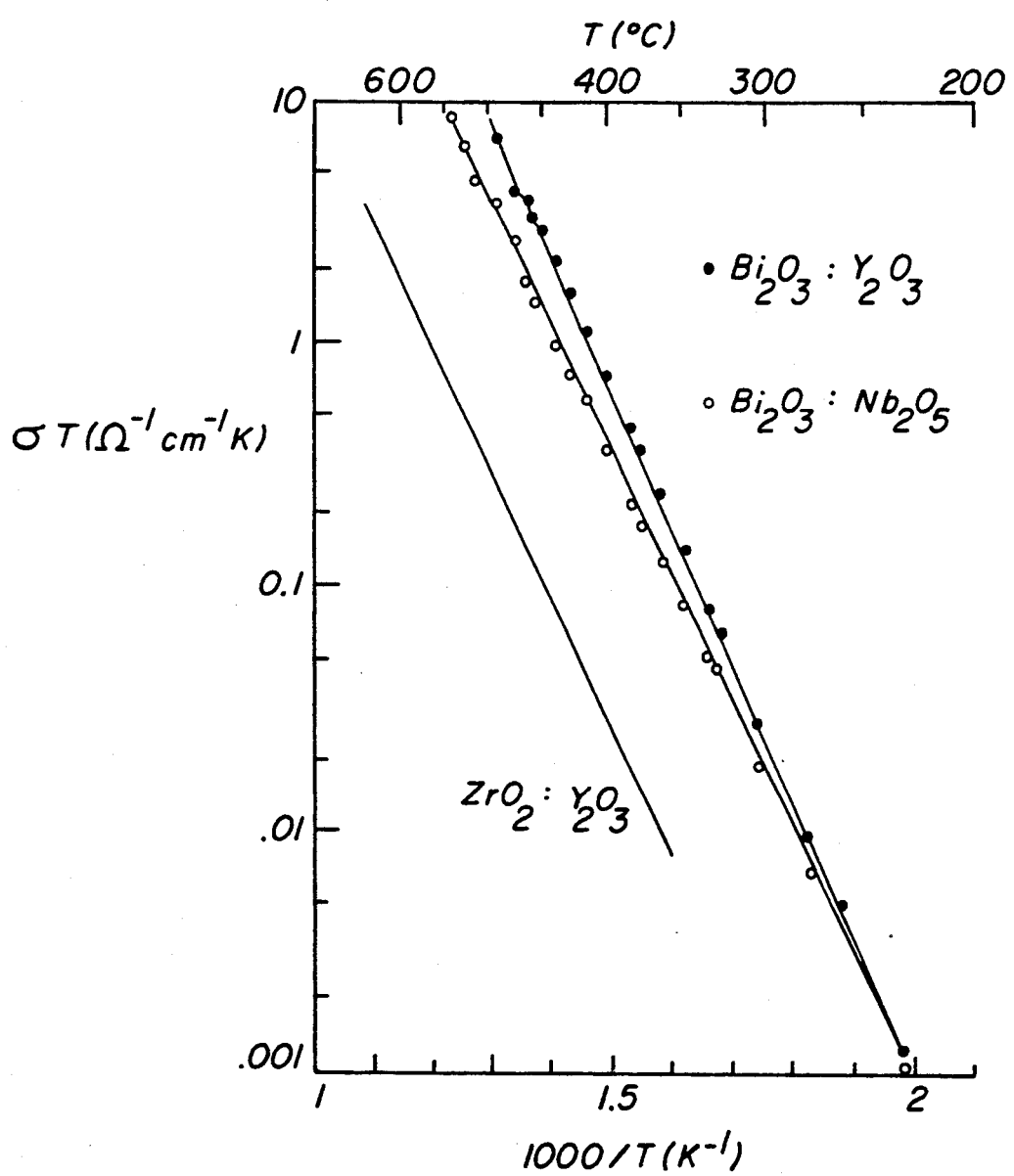

OXYGEN GENERATOR HAVING HONEYCOMB STRUCTURE

BACKGROUND OF THE INVENTION

The present invention relates to an oxygen generator, and more particularly, to a device for separating oxygen from a first gas and generating therefrom a second gas having a relatively high oxygen partial pressure.

Oxygen tends to move from a gas containing a high concentration of oxygen to one of lower concentration. If the two gases are separated from each other by an oxygen ion conductor, oxygen molecules will dissociate on one surface of the conductor and absorb electrons to form oxygen ions. These oxygen ions can then diffuse through the ionic conductor, leaving the entry surface with a deficiency of electrons. Emerging on the exit or low oxygen concentration side of the ion conductor, oxygen ions give up electrons to form molecular oxygen, leaving the exit surface with an excess of electrons. Thus, an electrical potential difference, or EMF, is set up between the two surfaces of the ion conductor. The greater the difference in oxygen content of the two gases, the greater will be the tendency of oxygen to diffuse through the conductor, and the greater will be potential difference between the entry and exit surfaces.

The EMF generated by the difference in oxygen partial pressures may be calculated by the Nernst relation:

$$EMF = t_i(RT/nF) \ln (P_{O2}/P'_{O2}).  \quad \text{(Eq. 1)}$$

where $t_i$ is the ionic transference number, R is the gas constant, T is the absolute temperature, n is the number of electrons involved in the electrode reaction, F is the Farady constant, and $P_{O2}$ and $P'_{O2}$ are the oxygen partial pressures in the first and second gases, respectively. In the present case, the electrode reaction is $O_2 + 4e\ 2O^{-2}$, and thus n=4.

These basic principles underly the operation of oxygen sensing devices, generally well known in the art. Oxygen sensors function by monitoring the EMF developed across an oxygen ion conductor which is exposed to gases having different oxygen partial pressures $P_{O2}$ and $P'_{O2}$.

The reciprocal principle underlies the operation of oxygen separators such as disclosed by Lawless U.S. Pat. No. 4,296,608. That is, where a voltage is applied to an oxygen ion conducting material, and if $P_{O2} = P'_{O2}$, oxygen ions will be forced to flow across the material such that $P_{O2} = P'_{O2}$. Thus, one gas will become richer in oxygen than the other, resulting in a basic oxygen separator.

As an alternative way of viewing the operation of an oxygen separator, consider an oxygen sensor in which a certain voltage signal V is generated by two gases in which $P_{O2} = P'_{O2}$. Now, if a reverse voltage $-V$ is applied to the material, the flow of oxygen ions through the material may be completely stopped. Increasing the magnitude of the negative voltage will then cause oxygen ions to flow in a reverse direction.

Consequently, an oxygen separator can be formed by operating an oxygen sensor in reverse. The above-mentioned Lawless patent provides a basic physical structure wherein these principles may be practically applied to separate oxygen from one gas stream to another.

A further need exists, however, to embody such basic structures in devices which may be practically operated to generate oxygen. What is needed, therefore, is a physical structure for such a separator that can provide a practical application of these principles.

SUMMARY OF THE INVENTION

The present invention meets this need by providing physical structures for an oxygen generator generally of the oxygen ion conducting type. Such generators are, in particular, useful to generate oxygen from air for home breathing applications.

In accordance with one aspect of the present invention, an oxygen generator is provided which includes a ceramic honeycomb body having a plurality of first and second channels. The channels are generally parallel and extend from the front face to the rear face of the honeycomb body. Use of a honeycomb body eliminates costs associated with manufacturing and assembling a plurality of separately manufactured tubes and the honeycomb design is, thus, well suited for use in the present invention. Electrodes, preferably porous metal electrodes, are fired onto the surfaces of the first and second channels along the length thereof. In the preferred embodiment of the invention, the first and second channels are arranged in alternating rows, resembling a striped pattern laterally across the faces of the ceramic honeycomb body. The electrodes of the first and second channels are connected in such a manner that they are electrically in parallel to a voltage source. The voltage source charges the first channels negatively and the second channels positively. The flow of oxygen ions between first and second channels completes the circuit. Parallel connection of the channels accomplishes the practical requirement of reducing the electric power needed to operate the oxygen generator.

In the preferred embodiment of the invention, electrodes in the second channels are connected in parallel by intersecting each row of second channels by one of a plurality of third channels. The third channels also include metal electrodes fired into the surfaces thereof which are electrically connected to electrodes in the row of second channels. These third channels, disposed laterally in the ceramic honeycomb body, extend to a side face thereof where the metal electrodes of the third channels are electrically interconnected, thereby placing all electrodes in the second channels in parallel. Further, the third channels serve as a convenient means to collect oxygen generated in the second channels. By firing ceramic plugs into the openings of the second channels, oxygen generated therein is conducted through the third channels to a side face of the ceramic honeycomb body where the oxygen may be easily collected in a manifold.

Finally, the electrodes of the first channels may be electrically connected in parallel by a first conductor, preferably a layer of metal, porous or not, fired along the front or back faces, or both, of the ceramic honeycomb body. As the first channels remain open at the front and back faces, the layer interconnects the electrodes therein. The open design of the first channels further permits a first gas, such as air, to flow freely therethrough. In addition, the open design permits efficient heat exchange between the first gas, the ceramic honeycomb body, and the oxygen generated therein.

In another embodiment of the invention, an oxygen generator is provided which includes a ceramic body having at least two cells, each cell comprised of a ceramic honeycomb body having channels and electrodes connected as described above. Second conductors, preferably strips of metal, are disposed or fired on the surface of the body to interconnect the separate cells in series to a voltage source. By electrically connecting the channels in parallel and the cells in series, two practical results are accomplished: power consumption and the amperage required to operate the oxygen generator are both reduced. Taken together, these considerations are significant practical considerations.

In an oxygen generator having at least two cells, the cells are arranged in columns, preferably two columns, having a separating wall therebetween. Such a two-column structure is particularly advantageous as the third channels may be easily manifolded along the side faces of the body to collect oxygen generated, while inlet and exhaust manifolds on the front and back faces, respectively, enhance the flow-through design of the first channels.

Thus, in a further aspect of the oxygen generator of the present invention, separate gas streams may be maintained in the first channels and in the second and third channels by means of a two-piece manifold surrounding the ceramic body. The first piece comprises the inlet manifold and the second piece comprises the exhaust and oxygen manifolds. The inlet manifold, located downstream from a flow control valve, supplies a first gas to the first channels. Preferably, a heater is further included in the inlet manifold for use during start-up of the oxygen generator. In the second piece, the exhaust manifold collects spent gas from the first channels, while the oxygen manifold collects oxygen from the third channels along the side faces of the ceramic body. Made preferably of thin-walled Kovar ®, the two piece manifold is adapted to have its thermal expansion matched to that of the ceramic body. The manifolds may be sealed in place by fired ceramic slurry, and electrically isolated from the electrode and other conductors.

In yet another aspect of the present invention, a heat exchanger, preferably a counter-flow heat exchanger, may be placed in the inlet and outlet gas streams to transfer heat from spent first gas and oxygen into the inlet first gas stream. In operation, the heat exchanger pre-heats the inlet first gas stream. It has been determined that pre-heating of the inlet first gas stream permits the inlet manifold heater, used during start-up, to be turned off during steady state operations.

The oxygen generator of the present invention may be made of electrolytic ceramics which are well known in the prior art and may be represented by the generic formulas:

$Bi_2O_3:Nb_2O_5$ $Bi_2O_3:Y_2O_3$ $Bi_2O_3:Eu_2O_3$ $ZrO_2:Y_2O_3$ $ZrO_2:CaO$ $ZrO_2:MgO$ $CeO_2:Y_2O_3$

A preferred ceramic material for use in these devices is $Bi_2O_3:Nb_2O_5$ ceramic. $Bi_2O_3:Nb_2O_5$ is more advantageous than other ceramics, such as Z or $O_2:Y_2O_3$, as $Bi_2O_3:Nb_2O_5$ has lower sintering temperatures (e.g. approximately 1000° C.) which facilitate honeycomb fabrication. This ceramic may typically be produced by mixing $Bi_2O_3+Nb_2O_5$ in appropriate amounts. The mixture is then calcined for approximately 24 hours at 800° C., and sintered for approximately 2 hours at 850°–950° C. In addition to their lower sintering temperatures, these types of ceramics further have high oxygen ionic conductivities, large thermal conductivity, and small coefficients of thermal expansion. As a result, structures made of these ceramics have greater resistance to thermal shock than other materials. However, all of the above electrolytic ceramic materials are useful in the practice of the present invention. Honeycombs may be made in at least two ways known in the art: by extrusion of a ceramic slurry; or by tape-casting a ceramic slurry, and then corrugating the tape into a honeycomb. However the honeycomb is made in the green (unfired) stated, it must thereafter be fired, and it is here that the low sintering temperature of the $Bi_2O_3:Nb_2O_5$ ceramic is an advantage over zirconia ceramics.

The porous metal electrodes discussed may be made of platinum or other suitable metal. In addition, copper or nickel wool or mesh may be used in the channels to reduce electrode resistance. A voltage source may be connected to the oxygen generator by copper wires and copper wool buttons or other suitable means. Connecting wires are preferably thin to reduce heat conduction away from the oxygen generator. Gold or nickel plating of copper connectors is preferable to prevent oxidation of the copper at the high temperatures at which the oxygen generator operates. To prevent shorting, damage or grounding of exposed conductors and electrical connections, such conductors and connections on the outer surfaces of the oxygen generator may, alternatively, be located in recesses; and whether recessed or not, a protective ceramic layer or a cap of ceramic slurry may be fired over the conductors or connections.

Accordingly, it is an object of the present invention to provide an oxygen generator constructed of a ceramic material having a plurality of first, second and third channels including electrodes connected to a voltage source; to provide such an oxygen generator having reduced material and production cost relative to presently known devices; to provide such a device having a high degree of thermal shock resistance; to provide such a device that is simple and can be made of relatively small size, and is suitable for, among others, home breathing applications. Other objects and advantages of the invention will be apparent from the following description, the accompanying drawings, and the appended claims.

BRIEF DESCRIPTION OF THE DRAWINGS

FIG. 4 is an exploded perspective view of the manifold assembly of the oxygen generator;

FIG. 5 is an assembled view of the oxygen generator with the manifold assembly, heat exchanger and inlet valve;

FIG. 6 is a sectional view of the assembled oxygen generator of FIG. 5 taken along line 6—6;

FIG. 10B is a schematic representation of the six steps used to achieve channel electroding and plugging consistent with series interconnection of cells;

FIG. 12 is a graph of data showing oxygen ionic conductivity v. temperature for various ceramics.

DETAILED DESCRIPTION OF THE PREFERRED EMBODIMENT

The present invention provides physical structures for oxygen generators of the ionic conducting type. Single cell and multi-cell honeycomb structures are represented generally in FIGS. 7A and 1, respectively.

Figure 7A:
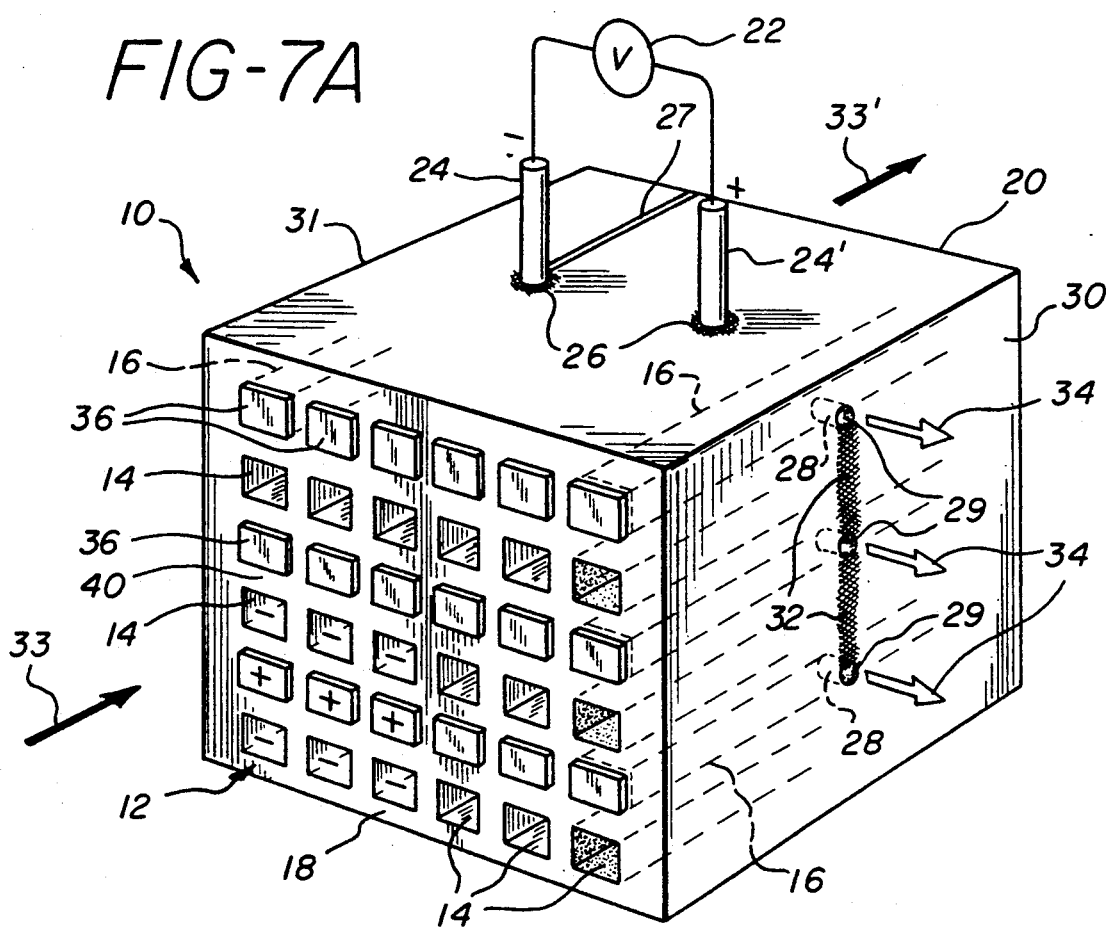
FIG. 7A is a perspective view showing an embodiment of the oxygen generator having alternating rows of first and second channels.
Figure 8:
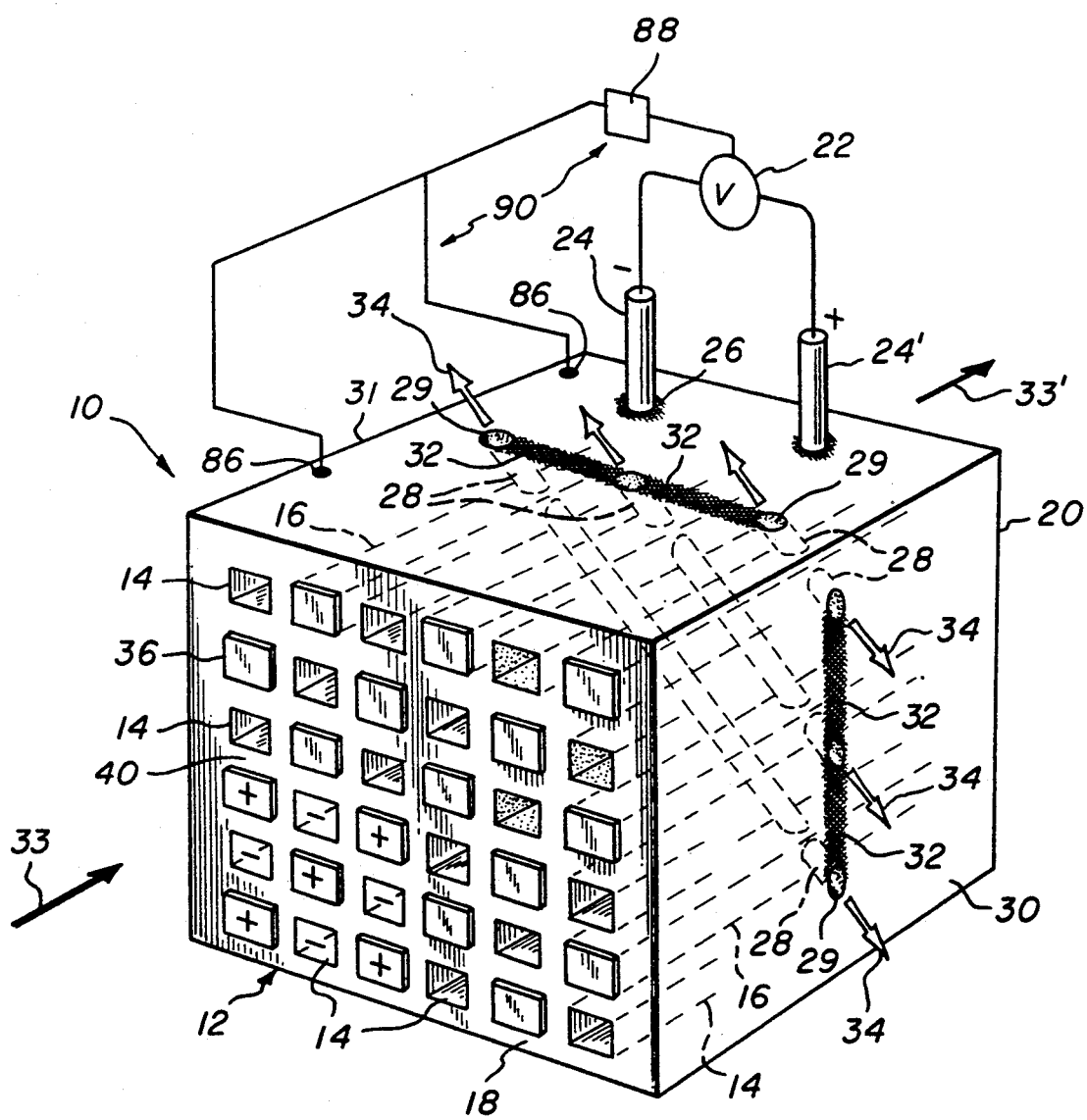
FIG. 8 is a perspective view showing an alternative embodiment of the oxygen generator of FIG. 7A.
Figure 9A:
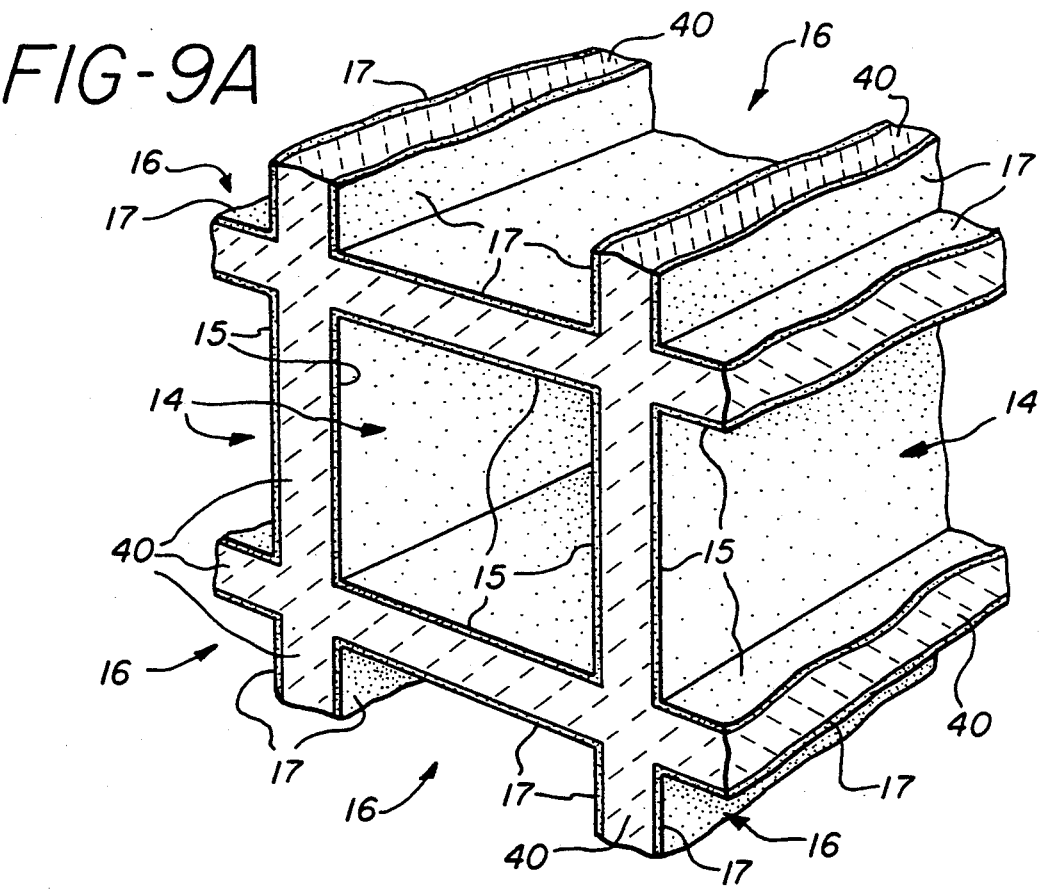
FIG. 9A is a schematic perspective representation of electrodes and channels in the oxygen generator.

In one aspect of the present invention, shown in FIG. 7A, an oxygen generator 10 is provided which includes a ceramic honeycomb body 12 having two or more channels denominated first and second channels 14 and 16, respectively Honeycomb geometries, having a plurality of channels, are ideal for making the body 12 of oxygen generator 10. Such honeycomb bodies 12 are disclosed by Bagley U.S. Pat. No. 3,790,654 and made by extrusion or tape casting methods known in the art, or as disclosed herein. Channels 14 and 16 are generally parallel and extend from the front face 18 to the rear face 20 of honeycomb body 12. While the oxygen generator illustrated in FIG. 7A has 36 channels, it is contemplated that oxygen generators having fewer channels, or having 100 or more channels, may be produced. The cross-sectional configurations of honeycomb body 12 and channels 14 and 16 are not critical. Square cross-sections are shown and preferred for convenience, and, in particular, are suitable for forming larger bodies as disclosed in FIG. 1. As also shown in FIG. 9A, porous metal electrodes 15 and 17 are fired onto the surfaces of channels 14 and 16, respectively, along the length thereof. By virtue thereof, channels 14 and 16 are oppositely charged, as illustrated on front face 18 in FIGS. 7A and 8.

Referring again to FIG. 7A, in the preferred embodiment, the first and second channels 14 and 16 are arranged in alternating rows, resembling a striped pattern laterally across faces 18 and 20 of ceramic honeycomb body 12. Such a striped pattern aids in flowing a first gas 33, preferably air, through first channels 14. The flow-through design of body 12 aids the throughput of first gas 33 required to replenish oxygen transmitted across channel walls 40, thus reducing voltage requirements for oxygen ion conductivity. As shown in FIG. 8, a checked Pattern of first and second channels 14 and 16 is also possible, but not preferred because, although diagonal stripes and diagonally disposed third channels may be made, manufacture of ceramic honeycomb body 12 and electrode connections described below are more difficult.

Figure 11A:
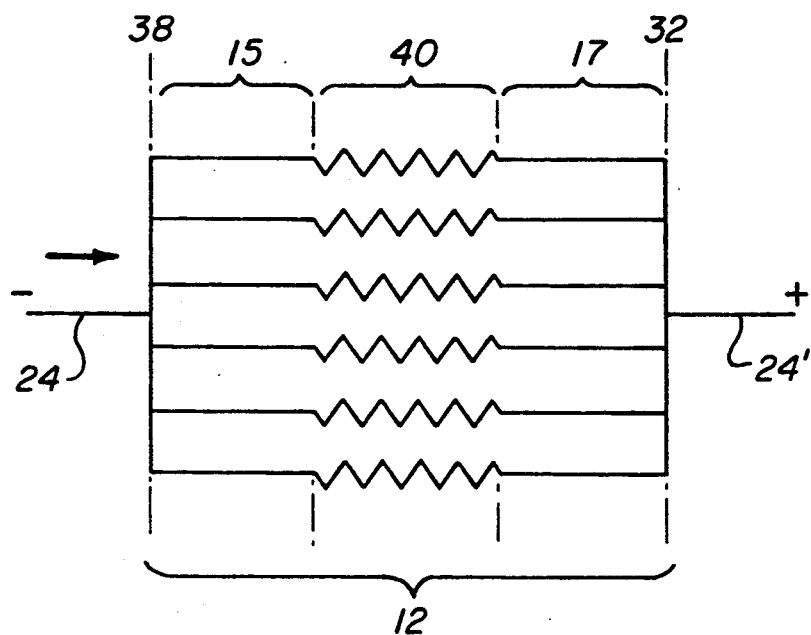
FIG. 11A is a schematic electrical representation of the parallel circuits formed by electrodes in the embodiment of the oxygen generator illustrated in FIG. 7.

Regardless whether a striped or checked pattern is made, electrodes 15 and 17 of the first and second channels are connected in such a manner that they are electrically in parallel to a voltage source 22 and oppositely charged as shown in FIGS. 7A and 8 and represented schematically in FIG. 11A. Connection of channels in parallel has the advantage of reducing the electrical power needed to operate oxygen generator 10. Voltage source 22 is preferably connected by copper lead wires 24 and 24' and copper wool buttons 26 to electrodes 15 and 17, respectively. Lead wires 24 and 24' may penetrate directly through the top of body 12 (as shown in FIG. 8) or indirectly connect to their respective electrodes by intervening conductors (such as 27 in FIGS. 7A and 7B).

Figure 7B:
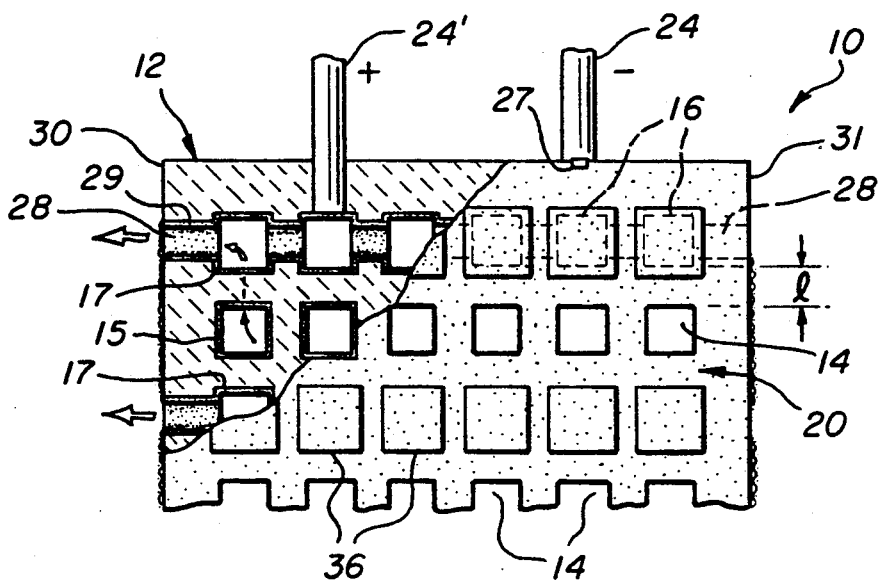
FIG. 7B is an enlarged elevational rear view of the oxygen generator of FIG. 7A showing electroding.

In the preferred embodiment of FIG. 7A, as best shown in FIG. 7B, electrodes 17 are connected in parallel by intersecting each row of second channels 16 by one of one or more third channels 28 which have electrodes 29 fired into the surfaces thereof, electrically connecting to electrodes 17. Third channels 28, disposed laterally in the ceramic honeycomb body 12, extend to a side face 30 (or alternatively, 31) thereof, where electrodes 29 of the third channels 28 are electrically interconnected by one or more third conductors 32, preferably of metal, porous or not, fired on the surface of side face 30. Thereby, all electrodes 17 of second channels 16 are placed in parallel. Further, third channels 28 serve as a convenient means to collect oxygen 34 generated in second channels 16.

By firing a plurality of ceramic plugs 36 (shown best in FIG. 10A) into the openings of second channels 16, oxygen 34 generated therein from first gas 33 is conducted through third channels 28 to a side face 30 (or alternatively, 31) of the ceramic honeycomb body 12. There, oxygen 34 may be easily collected in a manifold 62 in a manner such as is shown and preferred in FIGS. 4-6. Different alternate manifold and electrode designs are possible. As an alternative, for example, metallic wires may be inserted through third channels 28 to intersect and connect electrodes 17 in parallel, and third channels 28 eliminated. With plugs 36 eliminated from one or both faces 30 or 31 of body 12, a different manifolding arrangement covering alternate rows of channels 16 may be used to collect oxygen at the surfaces of faces 18 and/or 20.

Figure 10A:
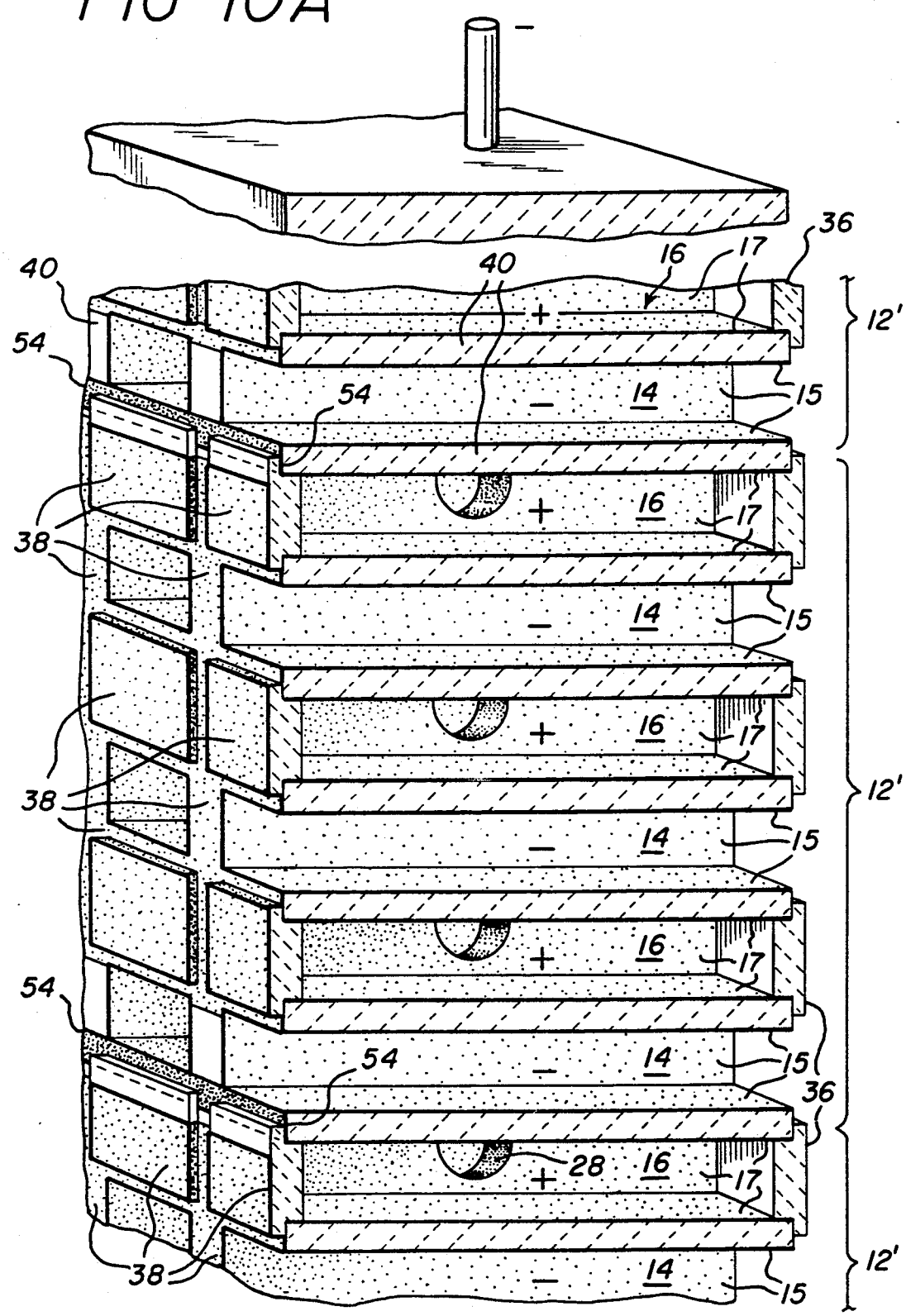
FIG. 10A is a schematic representation of the various electrodes at a cell interconnection.

Finally, as shown in FIGS. 10A and 10B, electrodes 15 of first channels 14 may also be electrically connected in parallel by a first conductor 38, preferably a layer of metal, porous or not, fired along the front or back faces 30 or 31, or both, of ceramic honeycomb body 12 and covering the outer surfaces of plugs 36, as well. As shown, first conductor 38 communicates with electrodes 15 in first channels 14, placing them in parallel. Thus, as represented schematically in FIG. 11A, parallel circuits are formed by the oppositely charged electrodes 15 and 17, which circuits are completed when oxygen ions transit across channel walls 40 under the EMF established by voltage source 22.

In a further alternative, the oxygen generator 10 may be provided with first, second and third channels 14, 16, 28, as aforesaid, but with third channels 28 intersecting those channels which serve as the first channels 14. In this alternative embodiment, the first and second channels 14, 16 are arranged in alternating rows, as before, with the first channels 14 open at the first or front face 18 (see FIG. 2), while the second channels 16 are open at the second face 20. Thus, the first gas 33 flows in a path through the first channels 14 in front face 18 and the third channels 28 in a third or lateral face 30. Oxygen produced in the second channels 16 is collected by an oxygen manifold from the second channels 16 at the second face 20.

Figure 1:
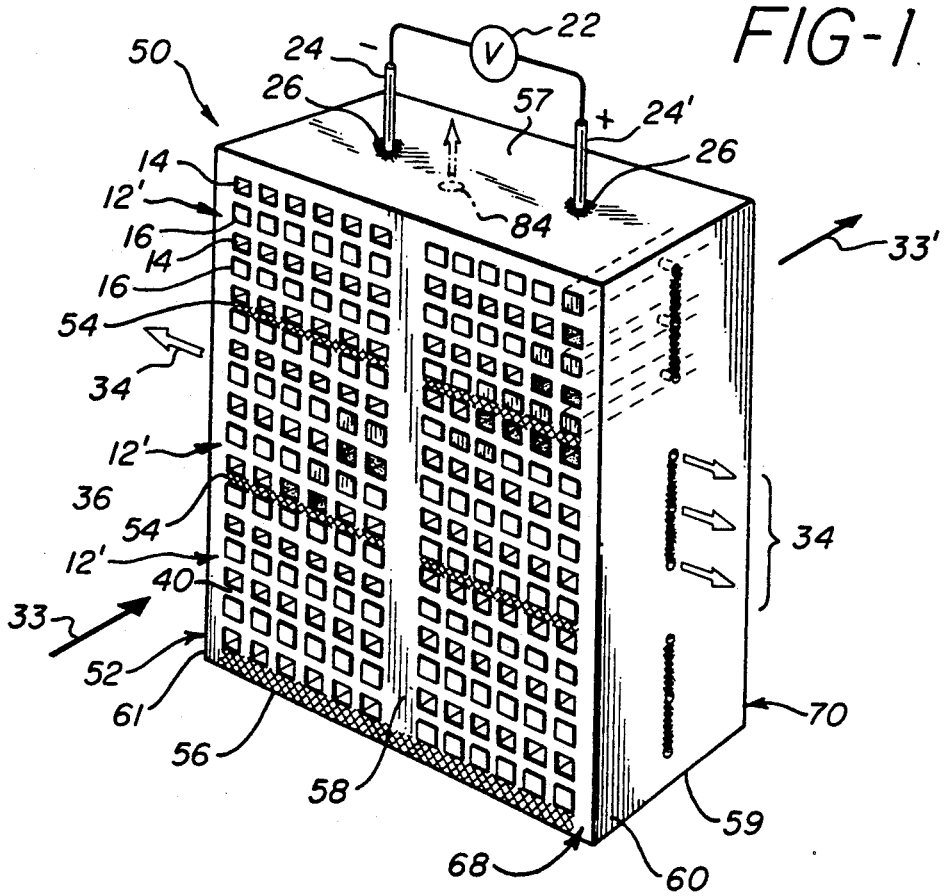
FIG. 1 is a perspective view of one embodiment of an oxygen generator in accordance with the present invention having multiple cells.

In another embodiment of the invention, shown in FIG. 1, where like numerals represent like elements, an oxygen generator 50 is provided which includes a ceramic body 52 having at least two cells 12'. Each cell 12' is comprised of a ceramic honeycomb body 12 having channels and electrodes connected as described above. As illustrated in FIG. 1, cells 12' have 30 or 36 channels, but the number of channels may vary as described above. Second conductors 54 and 56, preferably strips of metal, porous or not, are disposed or fired on the surface of body 52 to interconnect separate cells 12' in series to voltage source 22. Such cells 12' are arranged in columns, preferably two columns, having separating wall 58 therebetween. Connection of channels in parallel within a cell 12' and cells 12' in a series accomplishes the practical result of reducing the electrical power needed while at the same time reducing the amperage needed to operate oxygen generator 50.

Figure 2:
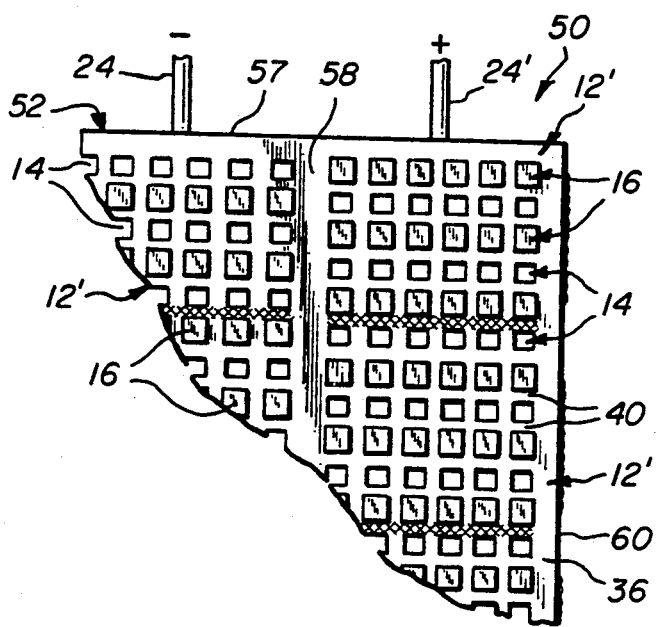
FIG. 2 is an enlarged elevational view of the upper portion of the generator taken along lines 2—2 in FIG. 1.
Figure 11B:
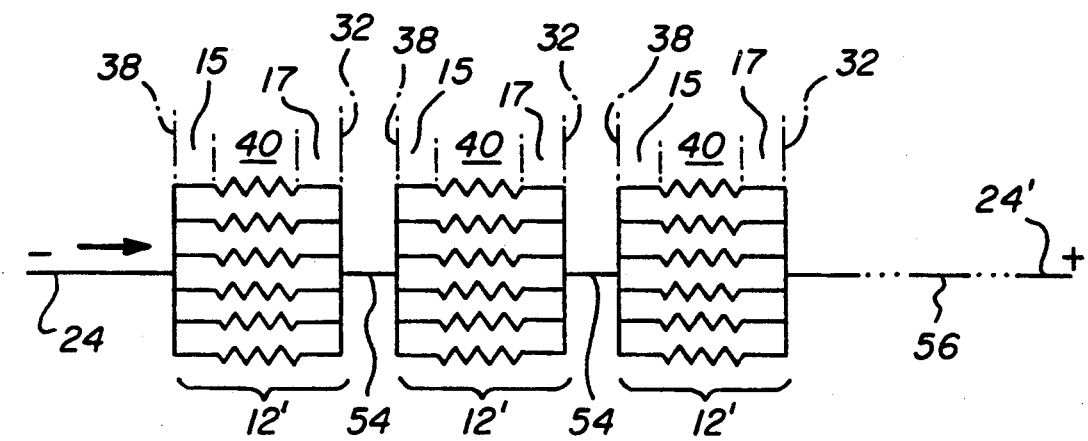
FIG. 11B is a schematic electrical representation of the parallel circuits of the electrodes in the embodiment of the oxygen generator illustrated in FIG. 1.

Electrical connection of voltage source 22 to a two-column structure of body 52 is facilitated by beginning each column with a different row of first or second channels 14 or 16. As illustrated in FIG. 2, the left or first column begins with a row of first channels 14 connecting through the top of body 52 to negative lead 24 and the right or second column begins with a row of second channels 16 connecting through the top of body 52 to positive lead 24'. As further shown in FIGS. 1 and 2, at each cell interconnection, conductor strip 54 interconnects the last row of channels 14 or 16 to the first row of channels 16 or 14, respectively, in adjacent cells. The manner of interconnecting with conductor strip 54 is shown in more detail in FIGS. 10A and 10B. As can be seen in FIG. 10B, cells 12' are electroded and then interconnected by conductor strip 54 through a multi-step process. Ultimately, as shown in FIG. 10A, conductor strip 54 interconnects the positive and negative circuits of adjacent cells 12', but maintains the electrical separation of positive and negative electrodes within a single cell. As a result, adjacent cells 12' are interconnected in series. In similar fashion, conductor strip 56, shown in FIG. 1, interconnects the last rows of the first and second columns to maintain the series relationship among cells 12'. The series relationship between cells 12' is represented schematically in FIG. 11B.

While the series interconnection of cells 12' is preferred to reduce power and amperage requirements, parallel interconnection of cells 12' is also possible by interconnecting adjacent conductor layers 38 of adjacent cells 12', and by interconnecting third conductors 32 of adjacent cells 12'. In a further modification, not preferred, where a plurality of columns are designed into body 52, and columns begin, alternately, with rows of first and second channels 14 and 16, separating walls 58 between adjacent columns may also act as an intermediate manifold 84 to collect oxygen from third channels 28 at top face 57 (or bottom face 59) as shown in phantom in FIG. 1.

A two column structure is particularly advantageous as, referring to FIGS. 4–6, third channels 28 may be easily covered by manifold 62 along the side faces 60 and 61 of body 52 to collect oxygen 34 generated therein. As well, inlet and exhaust manifolds 64 and 66 on front face 68 and back face 70, respectively, supply and collect first gas 33 and spent first gas 33' flowing through first channels 14.

Thus, in a further aspect of oxygen generator 50 (or 10), separate gas streams 33 and 34 may be controlled and maintained in first channels 14 (first gas 33) and in the second and third channels 16 and 28 (oxygen 34), respectively, by means of a two-piece manifold surrounding ceramic body 52 (or 12) as illustrated in FIGS. 4–6. As shown representatively in FIG. 5, inlet manifold 64 is located down stream from valve 72, preferably a flow control valve, and supplies first gas 33 to first channels 14. Preferably, a heater 74 is further included in the inlet manifold 64, and connected to a source of electricity (not shown) for use during start-up of the oxygen generator 50 (or 10). A second manifold, exhaust manifold 66, collects spent first gas 33' from first channels 14, and, a third manifold, oxygen manifold 62, collects oxygen 34 from the third channels 28 along the side faces 60 and 61 of ceramic body 52. The manifolds are made, preferably, from thin-walled Kovar ®, thermal expansion matched to the ceramic body 52, and the manifolds 62, 64 and 66 sealed in place by fired ceramic slurry 78, and electrically isolated from the electrodes and cell interconnections. A heat exchanger 76, preferably a counter-flow heat exchanger, may be placed in the inlet and outlet gas streams to transfer heat from spent first gas 33' and oxygen 34 into the inlet first gas stream 33. Thermodynamic analysis shows that heat exchange between inlet and outlet gas streams obviates the need for an external heat source during steady-state operation. Heater 74 is accordingly only needed for start-up of oxygen-generator 50 (or 10).

In an alternative embodiment, where the third channels 28 intersect the first channels 14, the manifolding is correspondingly arranged on different faces. Thus, oxygen generator 10 may be provided with an intake or inlet manifold 64 enclosing the third channel openings at one or more lateral faces 30 of the honeycomb body 12. An exhaust manifold 66 may be provided enclosing the first face 18 to receive spent first gas 33' from the first channels 14, and an oxygen manifold 62 may be provided enclosing the second face 20 to collect oxygen 34 generated in the second channels 16.

Figure 9B:
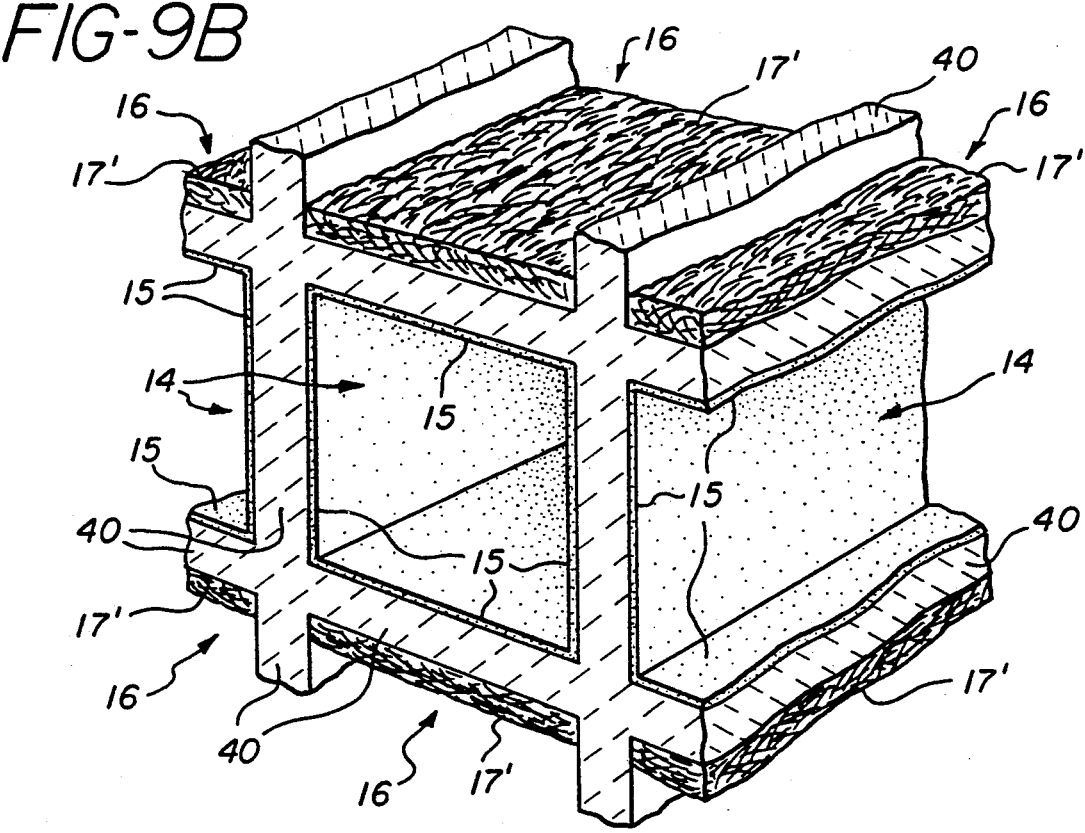
FIG. 9B is a schematic perspective representation of an alternative electrode and channels.

Porous electrodes 15, 17 and 29 disposed on surfaces of channels 14, 16 and 28 may be made of platinum or other suitable, preferably metallic, catalytic metal material. While preferable, it is not critical to the invention that electrode 29 is porous. Electrodes 15 and 17 (shown in FIG. 9A) are fine-grained to avoid irreversible electrode effects and are sponge-like to permit very rapid oxygen transport through the electrode layer. The porous electrodes 15, 17, and 29, and various conductors 27, 32, 38, 54 and 56 may be deposited by any of several known plating and/or deposition techniques, and may be comprised of suitable electrically conductive materials known in the art. In addition, copper or nickel wool or mesh 17' as shown in FIG. 9B may be used as electrodes in the second channels 15 to reduce electrode resistance. While significant reduction in electrode resistance results, the use of copper wool or mesh 17' is not preferred because of additional costs and time required for assembly. Voltage source 22 may be electrically connected through the top of the body 52 to the electrodes 15 and 17 of the first and second channels 14 and 16 by copper lead wires 24 and 24 , respectively, and copper wool buttons 26 or other suitable connecting means. Lead wires 24 and 24' are preferably thin to reduce heat conduction away from the oxygen generator. Gold or nickel plating of copper lead wires 24, 24' and buttons 26 is preferable to prevent oxidation of copper at high temperatures at which oxygen generator 50 (and 10) operate.

Figure 3:
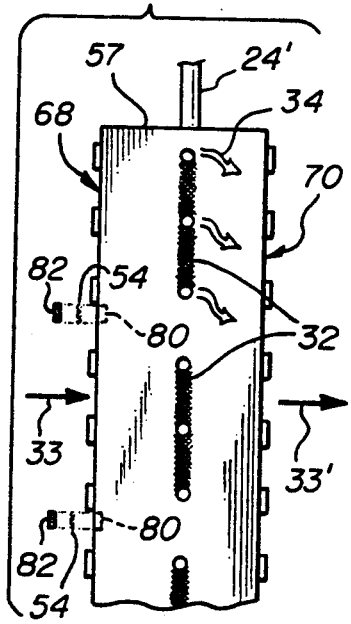
FIG. 3 is side view of FIG. 2.

To prevent shorting, damage or grounding, exposed electrodes, conductors and electrical connections, may, alternatively, be located in recesses 80 (illustrated in FIG. 3); and whether recessed or not, a protective ceramic layer or cap of ceramic slurry 82 (FIG. 3) may be fired over the electrodes, conductors or connections.

While many kinds of ceramics can be used in any applications as disclosed above, a preferred oxygen ion conducting ceramic material for use in the practice of the present invention is the $Bi_2O_3:Nb_2O_5$ ceramic. The $Bi_2O_3:Nb_2O_5$ ceramic is preferred over other materials because of its low sintering temperature, high oxygen ionic conductivity, relatively small thermal expansion coefficient and high thermal conductivity. Because the honeycomb is made in the green (unfired) stated, it has to be fired. Its low sintering temperature is a big advantage over zirconia ceramics. It has been found that this ceramic can be formed as a dense ceramic body by mixing $Bi_2O_3$ and $Nb_2O_5$, calcining for 10 to 24 hours at 800° C., preferably 24 hours at 800° C., and sintering for 2 to 24 hours at 850° C. to 950° C., preferably 24 hours at 900° C. A ratio of 15 mole % $Nb_2O_5$ to 85 mole % $Bi_2O_3$ is preferred. Under the preferred conditions, the ceramic sinters with no weight loss or gain to a density of 98% of the theoretical density of 8.56 gm/cm$^3$. A higher percentage of the theoretical density may be achieved using one of several methods well known in the ceramic art including, for example, a longer sintering time, finer starting particle size or hot isostatic pressing.

Ionic conductivity measurements made on samples of the $Bi_2O_3:Nb_2O_5$ and $Bi_2O_3:Y_2O_3$ ceramics were used to obtain the data shown in FIG. 12. The data is compared to data for $ZrO_2:Y_2O_3$. These data are plotted according to the ionic conductivity relation $$\sigma T = A \exp(-Q/kT) \qquad \text{(Eq. 2)}$$

where $\sigma$ is the ionic conductivity, T is temperature, A is a constant, Q is the activation energy, and k is Boltzman's constant. The FIG. 12 data show that the ionic conductivity of these $Bi_2O_3$-based ceramics are very close and exceed the conductivity of $ZrO_2:Y_2O_3$ for a given temperature. The FIG. 12 data were fitted to the ionic conductivity relation set out as Eq. (2) above. For a 90% theoretical density, Ln A=17.94 and Q(ev)=1.234×10$^4$. Such ceramic materials, have large ionic conductivities which thereby permit low threshold operating temperatures.

Thermal conductivity measurements performed at room temperature on a sample of the $Bi_2O_3:Nb_2O_5$ ceramic material at approximately 90% of theoretical density indicate a very large value, 0.036W cm$^{-1}$K$^{-1}$.

The thermal expansion coefficient of the $Bi_2O_3:Nb_2O_5$ ceramic is 5.2×10$^{-6}$ at room temperature. This small to moderate thermal expansion coefficient, combined with the large thermal conductivity value, ensures thermal-shock resistance for this ceramic.

The oxygen generators 10 and 50 of FIGS. 7A and 1, respectively, may be produced by extruding the ceramic honeycomb body 12 from a die as disclosed by Bagley U.S. Pat. No. 3,790,654. For example, powdered ceramic and binder may be mixed to form a paste-like consistency mixture which may then be extruded. After binder burn out, the body is sintered. The porous metal electrodes are deposited on the surfaces of the channels utilizing conventional deposition and/or plating techniques.

Thus, the advantages of the rectangular ceramic honeycomb geometry include a geometry which produces an oxygen generator 50 or 10 that is relatively compact in physical size, while channels of generally square cross-section present a substantial surface area of ceramic material for oxygen ion transport. The thin walls 40 are also advantageous as is the ability of the first gas 33 to flow straight through first channels 14.

By way of example, the dimensions and parameters for a $Bi_2O_3:Nb_2O_5$ ceramic oxygen generator 50 could be:

Cell (12') Dimensions and Parameters
  $\delta$ = wall (40) thickness = 10 mil = .0254 cm
  d = channel (14, 16) width = channel (14, 16) height = 50 mil = 0.127 cm
  L = $D_1 = D_2$ = 1.25 inches = 3.175 cm where
    L = length of channels (14, 16)
    $D_1$ = height of honeycomb body (12)
    $D_2$ = width of honeycomb body (12)
  n = number of cells (12') = 10
Gross Honeycomb Body (52) Dimensions Generally,
  2¼" wide × 1¼" deep × 6¼" high = 320 cm$^3$, weighing 812 g = 1.8 lb
General
  Power input, 200W or 500W to heater, 57-250W to oxygen generator
  Operating Temperature 580° C.

In operation, one major criterion of an oxygen generator is the threshold operating temperature. For the $Bi_2O_3:Nb_2O_5$ ceramic, a desirable threshold operating temperature is approximately 550° C.

Focusing on oxygen generator 50 as exemplary of the various embodiments, and with reference to FIG. 5, start-up of oxygen generator 50 begins with the closing of valve 72 and activating heater 74. The heater drives first gas 33 out through exhaust manifold 66 establishing the direction of gas flow. Thereafter, valve 72 is opened and incoming flow of first gas 33, preferably air, is maintained through oxygen generator 50 by convection. Because no blowers are required, the oxygen generator 50 may operate in any orientation.

Heating of body 52 is accomplished by joule heating which accompanies application of voltage required to drive oxygen ions across ceramic walls 40. Because ionic conductivity goes up with temperature, the oxygen generator 50 operates at an elevated temperature, as previously described, and eventually achieves thermal equilibrium. The preferred embodiment of the invention includes heat exchanger 76 which serves to reduce overall power demand, by pre-heating incoming first gas 33 with exhausted spent first gas 33 and oxygen 34.

After a period of time, both oxygen generator 50 and heat exchanger 76 achieve thermal equilibrium, and heater 74 is turned off. Accordingly, no external heat source is required for steady-stated operation.

Because excessive oxygen generator temperatures also serve to increase electrical resistance in electrodes 15 and 17, it will be seen that means for determining the temperature of the oxygen generator are desirable. Preferably, such means control the voltage signal of voltage source 22, and thus, regulate joule heating of oxygen generator 50 (or 10). This may be accomplished, for example, either by using standard thermocouple methods (not shown) or by silk screening a Pt+Pt−20% Rh thermocouple joint (not shown) directly onto body 52 or cell 12' to provide temperature readings to a voltage regulator 88 controlling the voltage signal of voltage source 22. Representatively shown in FIGS. 4 and 8 are thermocouples 86. Thermocouples 86 are connected in FIG. 8 to voltage regulator 88, and together therewith represent a means 88 for controlling the voltage source. Such temperature readings may further be used to control the operation of inlet valve 72 and heater 74 to make the operation of the oxygen generator 50 (or 10) entirely automatic. As shown in FIGS. 4 and 5, thermocouples 86 are connected to means 94 for controlling the heater and means 94 for automatically operating the valve, to permit automatic start-up of the oxygen generator. The valve 72, shown in FIG. 4, operatively connects to the means 94 for automatically operating the valve, shown in FIG. 5, by means of a line broken at "A".

In home breathing applications of the present invention, two somewhat limiting cases may be defined. At one extreme, such applications may call for a steady-state supply of oxygen, while others require oxygen on demand. In steady-state applications, for the example set forth above heater 74 is generally a 200 watt device, which leads to a 7–9 minute warm-up period. For non-demand applications, the heater is preferably sized at 500 watts to give a 3–7 minute start up period. For an estimated demand of 1 to 4 liters per minute oxygen for home breathing applications, power input levels for an oxygen generator 50 having dimensions and parameters as set forth in the example are generally 57 to 250 watts, and the operating temperature is generally from 580° to 670° C.

In general, the mass of oxygen transported from first gas 33, air, to the oxygen stream 34 may be estimated. As indicated in FIGS. 1 and 7, source 22 applies a voltage V across ceramic wall 40, of a thickness 1 indicated in FIG. 7A. Assuming that the current I across the ceramic wall 40 is due entirely to movement of oxygen ions (i.e., any electronic conduction is negligible), the mass m of oxygen transported is $$m = IM\Delta t / zeN_o \qquad \text{(Eq. 3)}$$

where M is the molecular weight (16 g for oxygen ions), Δt is the time interval in seconds, z is the ionic charge, e is the charge on a single electron, and $N_o$ is Avogadro's number. Substituting and making the appropriate units conversion, $$m = (8.29 \times 10^{-5})It, \qquad \text{(Eq. 4)}$$

where m is in grams, I is in amperes and t is in seconds. substituting from Coulomb's law for I, $$m = (8.29 \times 10^{-5}) Vt\sigma A/l \qquad \text{(Eq. 5)}$$

where V is the applied voltage, σ is the ionic conductivity, and A is the exposed area (through porous metallic layers 15 and 17) of wall 40 and 1 its thickness.

Taking as an example the $Bi_2O_3:Nb_2O_5$ ceramic material, the σ T data presented in FIG. 12 enables σ to be found as a function of temperature T. For illustrative purposes, it will be assumed that $1 = 0.005" = 1.27 \times 10^{-2}$ cm, V=500 volts, and $A = 10^3 cm^2$ (i.e., approximately 1 sq. ft.). Then in one hour the following amounts of oxygen will be passed through ceramic layer 50:

TABLE II

| T (°C.) | Mass of Oxygen Transported Mass of Oxygen Transport Per Hour |
|---|---|
| 400 | $1.572 \times 10^4$ g = 34.6 lb. |
| 500 | $1.275 \times 10^5$ g = 280.7 lb. |
| 600 | $6.305 \times 10^5$ g = 1389 lb. = 0.69 tons |

Thus, in a 24 hour period, the exemplary oxygen generator 50 operating at 600° C. could transport about 17 tons of oxygen into an evacuated space.

While the forms of apparatus herein described constitute preferred embodiments of this invention, it is to be understood that the invention is not limited to these precise forms of apparatus, and that changes may be made therein without departure from the scope of the invention which is defined in the appended claims.

What is claimed is:

1. An oxygen generator for separating oxygen from a first gas and generating therefrom a second gas having a high concentration of oxygen, comprising:
   (1) a body comprising one or more cells, each of said cells having:
   (a) an extruded, one-piece honeycomb body comprised of oxygen ion conductive material and including:
   (b) a plurality of faces including at least a first, second, and third face; and
   (c) a plurality of first and second channels defined by channel walls, and at least one third channel disposed therein, wherein:
   (i) said first channels extend from inlet openings in said first face of said honeycomb body to outlet openings in said second face of said honeycomb body, to receive a first gas having a partial pressure of oxygen therein; and
   (ii) said second channels extend generally parallel to said first channels from openings in said first face to openings in said second face;
   (iii) said at least one third channel extending laterally to an oxygen outlet opening in said third face, and each of said at least one third channels intersecting at least one of said second channels at a point between said first and second faces of said honeycomb body, such that each of said second channels is intersected by at least one third channel to provide flow communication therebetween, allowing oxygen generated in said second channels to flow outward therefrom through said third channels; and
   (d) electrodes disposed on said channel walls in said first and second channels;
   (e) means for electrically interconnecting said electrodes in said first channels;

(f) means for electrically interconnecting said electrodes in said second channels;

(g) means for sealing said second channels at said first and second faces;

(2) a voltage source and means disposed on said body for electrically connecting said electrodes in said one or more cells to said voltage source;

(3) means for collecting oxygen enclosing said oxygen outlet opening.

2. An oxygen generator as recited in claim 1 wherein said oxygen ion conductive material is selected from the group consisting of: $Bi_2O_3:Nb_2O_5$ or $Bi_2O_3:Y_2O_3$-based ceramic material.

3. An oxygen generator as recited in claim 1 wherein said body comprises two or more of said cells electrically connected in parallel.

4. An oxygen generator as recited in claim 1 wherein said means for electrically interconnecting said electrodes disposed in said first channels comprises:
a metallic conductive layer disposed on at least one face of said honeycomb body connecting to said electrodes disposed in said first channels of said one or more cells.

5. An oxygen generator as recited in claim 1 wherein:
said first channels and said second channels are arranged in alternating rows; and
said means for electrically interconnecting said electrodes disposed in said second channels of a cell comprises one or more electrical conductors, ones of said electrical conductors being electrically interconnected to the electrodes in at least one row of said second channels, and said one or more electrical conductors further electrically connected to others of said one or more electrical conductors disposed in the same cell.

6. An oxygen generator as recited in claim 1 wherein said means for electrically interconnecting said electrodes disposed in said second channels comprises:
one or more third electrodes disposed in one or more of said third channels electrically connecting with said electrodes disposed in said second channels, and
one or more electrical conductors interconnecting said third electrodes.

7. An oxygen generator as recited in claim 6 wherein said electrodes disposed in said third channels comprise a layer of metallic conductor disposed on the surfaces of one or more of said third channels.

8. An oxygen generator as recited in claim 6 further comprising means for protecting and insulating at least one of said one or more electrical conductors interconnecting said third electrodes.

9. An oxygen generator as recited in claim 1 further comprising:
means for supplying said first gas to said first channels at one of said first and second faces; and
means for receiving spent first gas from said first channels at the other of said first and second faces.

10. An oxygen generator as recited in claim 9 wherein said means for supplying a first gas to said first channels is electrically isolated from said body.

11. An oxygen generator as recited in claim 9 wherein said means for receiving is electrically isolated from said body.

12. An oxygen generator as recited in claim 9 wherein:
said means for supplying comprises an intake manifold, said means for receiving comprises an exhaust manifold, and said means for collecting oxygen comprises an oxygen manifold; and
said intake, exhaust and oxygen manifolds are formed by the assembly of two pieces.

13. An oxygen generator as recited in claim 9 further comprising:
a heat exchanger,
means for connecting said heat exchanger to each of said means for supplying, means for receiving and means for collecting oxygen for pre-heating said first gas entering said means for supplying with heat from spent first gas and oxygen from said first and second channels.

14. An oxygen generator as recited in claim 1 wherein said first and said second channels are generally square in cross section.

15. An oxygen generator as recited in claim 1 wherein:
said first and second channels are arranged in alternating rows; and
said body further comprises at least a first and a second column each column having one or more cells each, wherein:
the first column begins with a row of said first channels and the second column begins with a row of said second channels;
said first and second columns end with different rows of said first or second channels; and
subsequent ones of said columns have different first rows of first or second channels alternating as aforesaid, and different last rows of first or second channels alternating as aforesaid.

16. An oxygen generator as recited in claim 1:
wherein said body further comprises:
at least two columns of one or more cells each; and
at least one separating wall disposed between adjacent ones of said at least two columns, said separating wall positioned between said third faces of said one or more cells forming said columns; and
wherein said means for collecting oxygen comprises an oxygen manifold disposed in said separating wall to collect oxygen from said at least one third channel opening to said third faces.

17. An oxygen generator as recited in claim wherein:
said body is comprised of two or more cells; and
said means for electrically connecting said electrodes in said two or more cells to a voltage source comprises:
one or more strips of electrical conductor disposed on at least one face of each of said cells connecting adjacent cells in series; and
two or more leads connecting the first and the last of said series of cells to opposite poles of said voltage source.

18. An oxygen generator as recited in claim 17 further comprising means for protecting and insulating at least one of said one or more strips of said electrical conductor.

19. An oxygen generator as recited in claim 18 wherein said protecting and insulating means comprises a protective cap of ceramic.

20. An oxygen generator as recited in claim 18 wherein said means for protecting and insulating comprises one or more depressions in the surface of said body wherein at least one of said one or more strips of electrical conductor are disposed.

21. An oxygen generator as recited in claim 1 further comprising means for controlling said voltage source.

22. An oxygen generator as recited in claim 21 wherein said means for controlling further comprises:
one or more thermocouples disposed on said body; and
a voltage regulator electrically connected to said voltage source, and further connected to and responsive to said one or more thermocouples.

23. An oxygen generator as recited in claim 1 further comprising means for supplying a first gas to said first channels, and said means for supplying a first gas to said first channels further including a valve for controlling the supply of said first gas to said first channels.

24. An oxygen generator as recited in claim 23 wherein said means for supplying a first gas to said first channels further comprises a start-up heater for heating said first gas supplied to said first channels and initiating flow in a desired direction thereinto.

25. An oxygen generator as recited in claim 24 further comprising means for automatically operating said valve sequentially with said start-up heater for automatic start-up of said oxygen generator.

26. An oxygen generator as recited in claim 24 further comprising:
one or more thermocouples disposed on said body; and
means for controlling said start-up heater connected to said start-up heater, and further connected to and responsive to at least one of said one or more thermocouples.

27. An oxygen generator as recited in claim 1 wherein said means for collecting oxygen is electrically isolated from said body.

28. An oxygen generator as recited in claim 1 further comprising:
means for supplying said first gas to said first channels;
an exhaust manifold for receiving said first gas from said first channels;
a flow control valve located upstream of said means for supplying;
a heater disposed in said means for supplying downstream of said flow control valve; and
a heat exchanger for pre-heating said first gas entering said means for supplying with heat from the said spent first gas and said oxygen from said first and second channels.

29. An oxygen generator for separating oxygen from a first gas and generating therefrom a second gas having a high concentration of oxygen, comprising:
(1) a body comprising:
(a) one or more cells, each of said cells having:
(i) a honeycomb body comprised of oxygen ion conductive material and including:
a plurality of faces including at least a first, second, and third face; and
a plurality of first and second channels, and at least one third channel disposed therein, wherein:
said first channels extend from inlet openings in said first face of said honeycomb body to outlet openings in said second face of said honeycomb body, allowing a first gas having a partial pressure of oxygen to flow therethrough;
said second channels extend generally parallel to said first channels between said first and second faces and are sealed at said first and second faces;
said first channels and said second channels comprise alternate rows of channels in said honeycomb body; and
said at least one third channel extends laterally to an oxygen outlet opening in said third face, and is positioned to intersect at least one of said second channels at a point between said first and second faces of said honeycomb body, allowing oxygen generated in said at least one second channel to flow outward therefrom through said third channels, each of said at least one third channels intersecting at least one row of said second channels;
(ii) electrodes disposed in said first and second channels;
(iii) means for electrically interconnecting said electrodes in said first channels;
(iv) means for electrically interconnecting said electrodes in said second channels; and
(b) means for electrically connecting said electrodes in said one or more cells together;
(2) a voltage source connected to said means for electrically connecting to apply a voltage between said electrodes in said first and second channels; and
(3) means for collecting oxygen enclosing said oxygen outlet opening.

30. An oxygen generator as recited in claim 29 wherein said oxygen ion conductive material comprises $Bi_2O_3:Nb_2O_5$-based ceramic material.

31. An oxygen generator as recited in claim 29 wherein said means for electrically interconnecting said electrodes disposed in said second channels further comprises at least one third electrode disposed in said at least one third channel electrically connecting with said electrodes disposed in said second channels intersected by said at least one third channel.

32. An oxygen generator as recited in claim 29 wherein
said body further comprises at least a first and a second column having one or more cells each.

33. An oxygen generator as recited in claim 32 wherein:
the first column begins with a row of said first channels and the second column begins with a row of said second channels, and
said first and second columns end with different rows of said first or second channels, and
subsequent ones of said columns have different first rows of first or second channels alternating as aforesaid, and different last rows of first or second channels alternating as aforesaid.

34. An oxygen generator as recited in claim 32 further comprising at least one separating wall disposed between adjacent ones of said at least two columns, said separating wall positioned between said third faces of said one or more cells forming said columns, and wherein said means for collecting oxygen comprises an oxygen manifold disposed in said separating wall to collect oxygen from said at least one third channel opening to said third faces.

35. An oxygen generator as recited in claim 29 further comprising means for automatically controlling said voltage source including:
at least one thermocouple disposed on said honeycomb body; and
a voltage regulator connected to said voltage source, and further connected to and responsive to said at least one thermocouple.

36. An oxygen generator as recited in claim 29 further comprising:

means for supplying a first gas through said inlet openings to said first channels; and means for receiving spent first gas from said first channels through said outlet openings.

37. An oxygen generator as recited in claim 36 wherein said means for supplying a first gas to said first channels further comprises a start-up heater for heating said first gas and initiating the flow of gas flow through said first channels in a desired direction.

38. An oxygen generator as recited in claim 37 wherein said means for supplying further comprises:
   a valve for controlling the supply of said first gas to said first channels; and
   means for automatically operating said valve in cooperation with said start-up heater to initiate the flow of gas through said first channels in a desired direction;
   whereby said start-up heater may be operated to initiate flow in said first channels towards said outlet openings, and said valve opened automatically thereafter.

39. An oxygen generator as recited in claim 36 further comprising:
   a heat exchanger; and
   means for connecting said heat exchanger to said means for supplying said first gas and at least one of said means for receiving spent first gas and said means for collecting oxygen to pre-heat said first gas supplied to said oxygen generator.

40. An oxygen generator as recited in claim 36 further comprising:
   a valve for controlling the supply of said first gas to said first channels located upstream of said means for supplying;
   a start-up heater disposed in said means for supplying a first gas, said means for receiving spent first gas, and said means for collecting oxygen to pre-heat said first gas entering said means for supplying with heat from said spent first gas and said oxygen collected from said third channels.

* * * * *

UNITED STATES PATENT AND TRADEMARK OFFICE
CERTIFICATE OF CORRECTION

PATENT NO. : 5,205,990

DATED : April 27, 1993

INVENTOR(S) : William N. Lawless

It is certified that error appears in the above-identified patent and that said Letters Patent is hereby corrected as shown below:

Col. 14, Line 44 "as recited in claim wherein" should be --as recited in claim 1 wherein--.

Signed and Sealed this

Twenty-fifth Day of January, 1994

Attest:

BRUCE LEHMAN

*Attesting Officer*   *Commissioner of Patents and Trademarks*